US009565845B1

(12) United States Patent
Beesley

(10) Patent No.: US 9,565,845 B1
(45) Date of Patent: Feb. 14, 2017

(54) FLY DETERRENT

(71) Applicant: Brian Charles Beesley, Roseville, CA (US)

(72) Inventor: Brian Charles Beesley, Roseville, CA (US)

(*) Notice: Subject to any disclaimer, the term of this patent is extended or adjusted under 35 U.S.C. 154(b) by 136 days.

(21) Appl. No.: 14/121,600

(22) Filed: Sep. 22, 2014

(51) Int. Cl.
A01M 1/04 (2006.01)
A01M 29/08 (2011.01)
A01M 29/06 (2011.01)
A01M 29/00 (2011.01)
A01M 1/00 (2006.01)

(52) U.S. Cl.
CPC .................. A01M 1/00 (2013.01); A01M 1/04 (2013.01); A01M 29/00 (2013.01); A01M 29/06 (2013.01); A01M 29/08 (2013.01)

(58) Field of Classification Search
CPC ...... A01M 29/00; A01M 29/06; A01M 29/08; A01M 1/04
USPC ......... 43/113, 132.1, 124; 116/22 A; 40/410, 40/409, 406; 472/65; 428/13, 14, 7, 11; 206/0.8, 0.81, 0.815, 0.82, 0.83, 0.84
See application file for complete search history.

(56) References Cited

U.S. PATENT DOCUMENTS

| | | | | | |
|---|---|---|---|---|---|
| 1,287,968 | A | * | 12/1918 | Greenleaf | G08B 3/06 116/22 A |
| 2,842,879 | A | * | 7/1958 | Baumchen | F21S 10/007 40/406 |
| 2,919,510 | A | * | 1/1960 | Guilford | A47F 3/08 40/409 |
| 3,118,427 | A | * | 1/1964 | Stanzel | A01K 13/003 43/131 |
| 3,425,538 | A | * | 2/1969 | Lott, Jr | A47F 7/03 206/0.83 |
| 3,910,408 | A | * | 10/1975 | Husney | B65D 25/54 206/0.81 |
| 4,164,284 | A | * | 8/1979 | Witt | B65D 81/3846 428/11 |
| 4,899,485 | A | * | 2/1990 | Schneidmiller | A01M 1/02 43/107 |
| 4,908,980 | A | * | 3/1990 | Sherman | A01M 1/04 43/132.1 |
| 4,919,926 | A | * | 4/1990 | Watanabe | A01M 29/06 252/582 |

(Continued)

FOREIGN PATENT DOCUMENTS

| | | | | | |
|---|---|---|---|---|---|
| GB | 2269153 | A | * | 2/1994 | ............ A01M 29/08 |
| GB | 2325452 | A | * | 11/1998 | ............ A01K 93/00 |

(Continued)

Primary Examiner — Darren W Ark
(74) Attorney, Agent, or Firm — Risto A. Rinne, Jr.

(57) ABSTRACT

An apparatus for deterring flies by reversing their flight path has a transparent container that includes a plurality of outwardly facing planar surfaces. A liquid, preferably water, is disposed in the container. A penny or similar planar object formed of copper is preferably secured at each outwardly facing planar surface. Planar objects formed of a material other than copper or having a different color, shape, or varying degree of reflectivity can be used instead of or along with the penny. A hook or other means for hanging the container is provided. An optional battery or AC powered motor may be included to rotate the device around a center vertical axis. A less expensive version that is formed of a flexible transparent plastic container is also shown and described. The containers are either filled with liquid and sealed or are fillable by the user.

11 Claims, 2 Drawing Sheets

(56) References Cited

U.S. PATENT DOCUMENTS

| | | | | |
|---|---|---|---|---|
| 4,923,721 A * | | 5/1990 | Gilmore | A47G 33/0809 428/11 |
| 4,982,100 A * | | 1/1991 | Harding, Jr. | A01M 29/08 250/493.1 |
| 5,187,889 A * | | 2/1993 | Kraselsky | G09F 19/02 40/410 |
| 5,359,808 A * | | 11/1994 | Fitsakis | A01M 1/2016 43/132.1 |
| 5,392,558 A * | | 2/1995 | Blomquist | A01M 1/02 43/107 |
| 5,490,349 A * | | 2/1996 | Muramatsu | A01M 1/02 43/122 |
| 5,607,711 A * | | 3/1997 | Lagunas-Solar | A01M 1/226 426/248 |
| 5,666,750 A * | | 9/1997 | Segan et al. | G09F 19/08 40/410 |
| 6,042,022 A * | | 3/2000 | Rogozinski | B05B 11/0005 40/410 |
| 6,385,880 B1 * | | 5/2002 | Naragon | G09F 19/02 40/410 |
| 6,543,180 B2 * | | 4/2003 | Pace | A01M 29/12 43/107 |
| 6,601,337 B1 * | | 8/2003 | McKenney, Sr. | A01M 1/02 43/132.1 |
| 6,708,445 B1 * | | 3/2004 | Israely | A01M 1/02 43/132.1 |
| 6,814,021 B1 * | | 11/2004 | Turkewitz | A01M 29/06 116/22 A |
| 7,766,717 B2 * | | 8/2010 | Shapiro | G09F 19/08 40/409 |
| 7,784,215 B2 * | | 8/2010 | Cohnstaedt | A01M 1/04 43/113 |
| 7,930,989 B2 * | | 4/2011 | Doty, III | A01M 29/06 116/22 A |
| 7,988,984 B2 * | | 8/2011 | Hockaday | A01M 1/02 43/132.1 |
| 8,479,678 B1 * | | 7/2013 | Sandoval | A01M 29/08 43/124 |
| 8,689,473 B2 * | | 4/2014 | James | G09F 19/02 40/410 |
| 9,095,131 B2 * | | 8/2015 | Palermo | A01M 29/06 |
| 2002/0005006 A1 * | | 1/2002 | Phillips | A01M 1/04 43/113 |
| 2002/0184801 A1 * | | 12/2002 | Naragon | G09F 19/02 40/410 |
| 2003/0145793 A1 * | | 8/2003 | Mathews | A01M 29/08 119/6.5 |
| 2007/0141945 A1 * | | 6/2007 | Chipman | A01M 29/06 446/72 |
| 2007/0251460 A1 * | | 11/2007 | Olsen | A01M 29/08 119/61.53 |
| 2008/0257756 A1 * | | 10/2008 | Oakley | A45C 1/00 206/0.83 |
| 2009/0031612 A1 * | | 2/2009 | Hubbard | A01M 29/08 43/132.1 |
| 2011/0219664 A1 * | | 9/2011 | Casteel | A01M 29/08 43/107 |
| 2012/0055074 A1 * | | 3/2012 | Batten, II | A01M 29/10 43/132.1 |
| 2012/0222973 A1 * | | 9/2012 | Carron | G07F 9/06 206/0.81 |
| 2014/0153121 A1 * | | 6/2014 | Savage | A01M 29/08 359/850 |
| 2014/0261151 A1 * | | 9/2014 | Ronning | A01M 29/10 116/22 A |
| 2015/0027032 A1 * | | 1/2015 | Batten, II | A01M 29/10 43/113 |
| 2016/0227757 A1 * | | 8/2016 | Jacobson | A01M 1/04 |

FOREIGN PATENT DOCUMENTS

| | | | | |
|---|---|---|---|---|
| JP | 52021176 A | * | 2/1977 | |
| JP | 11018665 A | * | 1/1999 | |
| JP | 2001120155 A | * | 5/2001 | |
| JP | 2001269105 A | * | 5/2001 | |
| JP | 2001299184 A | * | 10/2001 | |
| JP | 2002159252 A | * | 6/2002 | |
| WO | WO 2008051685 A2 | * | 5/2008 | A01M 29/06 |

\* cited by examiner

FLY DETERRENT

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention, in general, relates to insect repellants and, more particularly, to a means for repelling flies.

Flies have long been a problem in many ways. They land frequently and spread diseases. They are also a nuisance and an annoyance. This is especially true in restaurants where their mere presence can cause angst to patrons.

They are also an annoyance in businesses of all types and homes. Their buzzing and landing can be a distraction to communication. While they have their purpose in nature, they are also an annoyance and a vector of disease and so it has long been desirable to keep them away from humans at certain times.

To this end many solutions have been tried, some effective, some not, and some with negative side effects. Attractant pest strips have attracted flies and other insects and an adhesive coating has retained them to the strips. While effective, unsightly strips covered with flies and other insects has not been pleasant.

Also, some people feel bad about killing flies and wish there was a more humane approach.

Citronella candles intended to repel mosquitos have proven largely ineffective at repelling flies.

Insecticide sprays produce harmful vapors that people may then inhale. Also, these sprays have a short period of efficacy. It is necessary to keep spraying to keep the flies away.

Thus far, no effective solutions have been found for keeping flies away from people and their food during barbecues when the air is filled with, apparently, highly attractive odors to flies. Yet, people have a generally strong aversion to flies landing on their barbecued burgers, hot dogs, or other foods when eating out of doors.

Additionally there is a need to keep flies away at farms and dairies. Flies are drawn to a variety of farm animals, particularly cows and horses. To promote sterile and/or sanitary conditions it is desirable to reduce the presence of flies on or near the cows and especially those cows that are being milked. Flies are also disturbing to people at farms and dairies.

Ideally, a way to repel or deter flies from entering or staying in certain areas, or wherever the presence of flies is deemed to be a problem, is desired. For example, a way to keep flies from entering buildings through windows or doorways is especially desired. Similarly, a way to repel flies from outdoor areas is also especially desired.

While many solutions have been tried no solution has been truly effective at repelling flies during these varied situations.

Accordingly, there exists today a need for a fly deterrent that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, such an apparatus would be useful and desirable.

2. Description of Prior Art

Fly deterrents are, in general, known. For example, the following patent documents describe various types of these devices, some of which may have some degree of relevance to the invention. Other patent documents listed below may not have any significant relevance to the invention. The inclusion of these patent documents is not an admission that their teachings anticipate any aspect of the invention. Rather, their inclusion is intended to present a broad and diversified understanding regarding the current state of the art appertaining to either the field of the invention or possibly to other related or even distal fields of invention.

U.S. Pat. No. 6,543,180 to Pace, that issued on Apr. 8, 2003;

U.S. Pat. No. 5,490,349 to Muramatsu, that issued on Feb. 13, 1996; and

U.S. Pat. No. 4,899,485 to Schneidmiller, that issued on Feb. 13, 1990.

And including U.S. patent application Publications:

U.S. Patent Application Publication No. 2011/0219664 to Casteel, et al., that was published on Sep. 15, 2011; and U.S. Patent Application Publication No. 2009/0031612 to Hubbard, et al., that was published on Feb. 5, 2009.

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a fly deterrent that is effective.

It is also an important object of the invention to provide a fly deterrent that repels flies.

Another object of the invention is to provide a fly deterrent that is useful in keeping flies out of and away from restaurants.

Still another object of the invention is to provide a fly deterrent that is useful in keeping flies away from homes.

Still yet another object of the invention is to provide a fly deterrent that is useful in keeping flies away from outdoor activities.

Yet another important object of the invention is to provide a fly deterrent that is useful in keeping flies away from outdoor cooking activities.

Still yet another important object of the invention is to provide a fly deterrent that is useful in repelling flies so they do not enter buildings.

A first continuing object of the invention is to provide a fly deterrent that is useful in preventing flies from entering openings, such as doors and windows into buildings.

A second continuing object of the invention is to provide a fly deterrent that is useful in keeping flies away from people.

A third continuing object of the invention is to provide a fly deterrent that does not kill flies.

A fourth continuing object of the invention is to provide a fly deterrent that is inexpensive.

A fifth continuing object of the invention is to provide a fly deterrent that lasts for a long time.

Briefly, a fly deterrent that is constructed in accordance with the principles of the present invention has a transparent container that includes a plurality of outwardly facing planar surfaces disposed around a 360 degree radius on a generally horizontal plane. Optional outwardly facing planes are preferably included that are disposed at a vertical angle other than along the horizontal plane and which are visible from either below the horizontal plane or above the horizontal plane, or both and at a top and bottom surface. A liquid, preferably water, is disposed in the container. A penny or similar copper object is preferably disposed in each outwardly facing planar surface. If desired, different colored objects of any desired color or combination of colors may be disposed in each outwardly facing planar surface. The objects do not have to be circular as other shapes are possible. The objects can be formed of any desired material. A hook or other means for hanging the container is provided. An optional battery or AC powered motor may be included to rotate the container around a center vertical axis. A less expensive version is also shown and described.

DETAILED DESCRIPTION OF THE INVENTION

Figure 1:
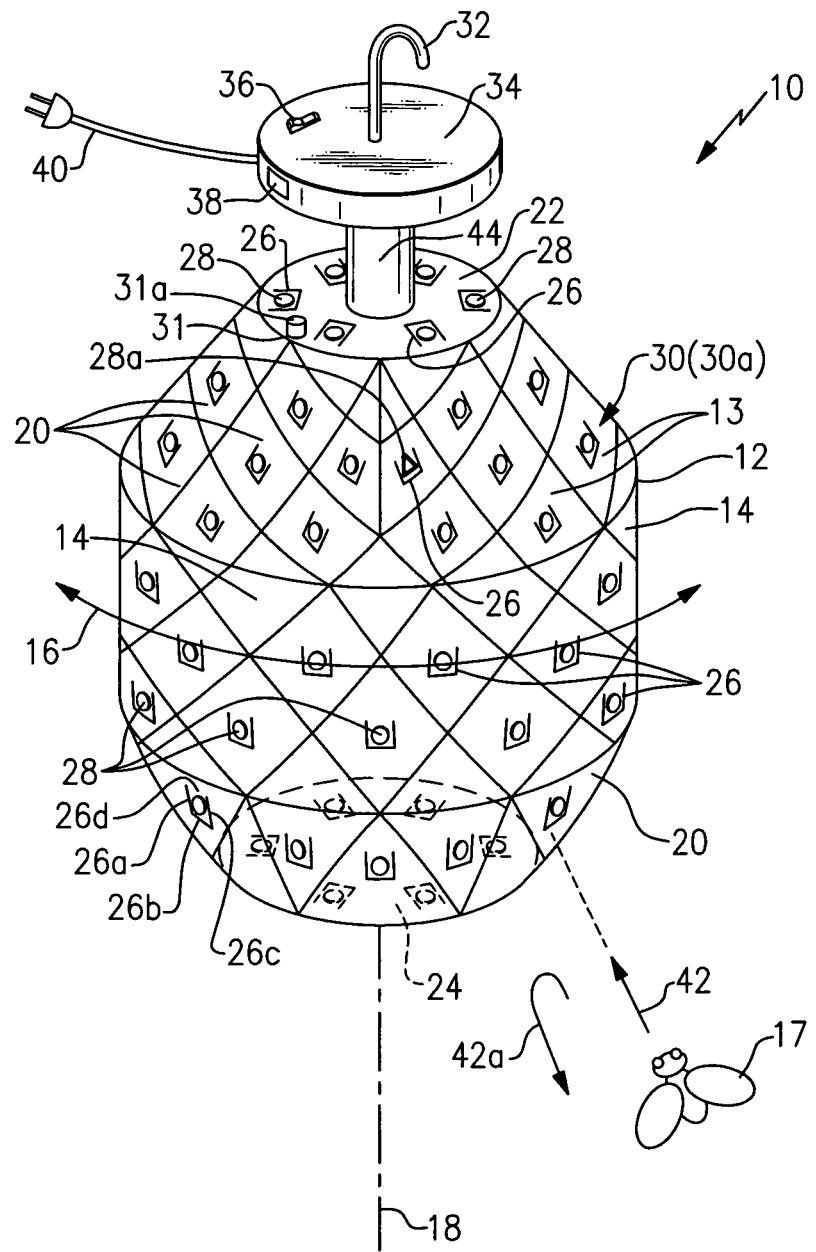
FIG. 1 is a view in perspective of a motor-operated fly deterrent.

Referring on occasion to both of the FIGURE drawings and now, in particular to FIG. 1, is shown a fly deterrent, identified in general, by the reference numeral 10.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

Certain examples are shown in the above-identified FIGURES and are described in greater detail below. In describing these examples, like or identical reference numerals may be used to identify common or similar elements.

Although the fly deterrent 10 has many possible embodiments, a preferred design is shown and described.

A sufficiently transparent container 12 is formed of any desired material, including plastic, glass or any other sufficiently transparent material.

The container 12 can be formed of a rigid material or it can be flexible. For example, a flexible plastic bag (see FIG. 2) could be used to form the container 12 of less expensive versions of the fly deterrent 10.

For certain versions of the fly deterrent 10 it may be desired to include a plurality of intersecting outwardly facing planar surfaces 13, as shown in the drawing and occurring between a plurality of lines 14. The outwardly facing planar surfaces 13 form what is akin to a geodesic dome.

The plurality of outwardly facing planar surfaces 13 are preferably disposed around a 360-degree radius along a generally horizontal plane, identified by arrow 16. Therefore at least one of the outwardly facing planar surfaces 13 is disposed at a various angle along the horizontal plane 16.

Therefore, to a fly 17 approaching the fly deterrent 10 from any position disposed along the horizontal plane 16 extending 360-degrees around a center vertical axis, as shown by dashed line 18 of the fly deterrent 10, at least one of the outwardly facing planar surfaces 13 would be visible to the fly 17. This is an important feature of the fly deterrent 10, and is described in greater detail, hereinafter.

Additional outwardly facing angled planes 20 are preferably included that are disposed at a vertical angle other than along the horizontal plane 16 and which are visible from either below the horizontal plane 16 or from above the horizontal plane 16, or both.

Preferably, at least one upper outwardly facing plane 22 is included and at least one lower outwardly facing plane 24 is included.

At least one transparent pocket 26 is attached to each of the outwardly facing planar surfaces 13, each of the outwardly facing angled planes 20, the upper outwardly facing plane 22 and the lower outwardly facing plane 24.

The pockets 26 are preferably attached to an inside or interior surface of the container 12. However, if desired, one or more of the pockets 26 could be attached to an outside or exterior surface of the container 12.

As shown the pockets 26 are generally rectangular in shape and are sealed along three edges 26a, 26b, 26c. The pockets 26, as shown, are open along a remaining fourth edge 26d. If desired, the pockets 26 could be sealed around all of the edges 26a-26d, during manufacture. This is discussed in greater detail, hereinafter.

A penny 28 (or other planar copper disk) is placed in each of the pockets 26, including those pockets 26 that are disposed on the outwardly facing planar surfaces 13, each of the outwardly facing angled planes 20, the upper outwardly facing plane 22 and the lower outwardly facing plane 24.

As shown, three pockets 26 and three pennies 28 in the three pockets 26 are disposed on the lower outwardly facing plane 24. However, as few as one pocket 26 with one penny 28 disposed therein can be included in the lower outwardly facing plane 24.

As shown, four pockets 26 and four pennies 28 in the four pockets 26 are disposed on the upper outwardly facing plane 22. However, as few as one pocket 26 with one penny 28 disposed therein can be included in the upper outwardly facing plane 22.

Including more than one pocket 26 and more than one penny 28 in the upper outwardly facing plane 22 increases the chances that at least one of the pennies 28 will be seen or noticed by the fly 17 if it approaches the fly deterrent 10 from above the horizontal plane 16.

Similarly, including more than one pocket 26 and more than one penny 28 in the lower outwardly facing plane 24 increases the chances that at least one of the pennies 28 will be seen or noticed by the fly 17 if it approaches the fly deterrent 10 from below the horizontal plane 16.

A liquid, as identified in general by reference numeral 30, is included in the container 12. The liquid 30 is sealed in the container 12 and therefore cannot evaporate or leak out of the container 12. If desired, the container 12 could be further modified to permit filling of the liquid 30 where it is to be used. A fill hole 31 is provided for this purpose if the container 12 is filled by the user. The fill hole 31 includes a plug 31a that is inserted and held by friction in an opening of the fill hole 31 or, alternately, the plug 31a includes screw threads that engage with corresponding threads provided in the fill hole 31.

The liquid 30 is sufficiently clear to allow viewing of at least one of the pennies 28 inside of the container 12 from any viewing angle outside of the container 12. Water is preferred for use as the liquid 30. If desired, a slight colored tint can be added to the water (or other type of the liquid 30) if it is determined that a colored tint improves efficacy of the fly deterrent 10 in deterring the approach of the fly 17.

The liquid 30 can penetrate the pockets 26, as desired. If the liquid 30 enters the pockets 26, the pockets 26 permit at least a thin film of liquid 30 to encircle some or all of each of the pennies 28.

A hook 32 is included at a top of the container 12. As shown, a bottom end of the hook 32 is attached to a top of an electric motor 34. If desired, the electric motor 34 is eliminated and the bottom end of the hook 32 is, instead, attached to the upper outwardly facing plane 22.

If the motor 34 is included, it preferably includes an on-off switch 36. One or more batteries 38 are included if the motor 34 is battery powered. If desired, a power cord 40 is attached to the motor 34. The power cord 40 allows connection of the motor 34 to an AC outlet (not shown).

While not known with certainty, it is believed that to the fly 17, the container 12 and the plurality of pennies 28 glistening therein, resembles a giant eye and that for some reason the flies 17 retreat from this apparition. The reason flies 17 are repelled (or deterred) may be different than understood. However, the invention is effective at repelling or deterring the approach of flies 17 toward the fly deterrent 10.

The fly deterrent 10 acts as a barrier to repel the fly 17. To the approaching fly 17, the barrier, as created by the fly deterrent 10, appears to be disposed on a plane that is perpendicular to a line of approach 42, as taken by the fly 17.

This effectively prevents flies 17 from crossing (i.e., flying) past the fly deterrent 10 along the plane of the barrier. It is apparent that an infinite number of planes extend radially through the center vertical axis 18.

Therefore, placement (i.e., hanging) of the fly deterrent 10, where desired, effectively prevents the passage of the fly 17 past the fly deterrent 10, regardless of the trajectory of the line of approach 42.

If the fly 17 is approaching the fly deterrent 10 along the line of approach 42, the fly 17 sees a flash of light from the fly deterrent 10 and reverses (i.e., changes) its flight path as shown by arrow 42a in which the fly 17 now flies away from the fly deterrent 10.

Therefore, if the fly deterrent 10 is hung, using the hook 32, in front of a door (not shown) into a restaurant, residence, or other building, the fly deterrent 10 acts as a barrier to prevent the fly 17 from entering (i.e., passing) through the door, even if the door is wide open.

If at least one of the fly deterrents 10 is placed along each line that defines a perimeter of a deck or other area, the fly deterrents 10 prevent flies 17 from entering into the deck area or other area.

If the fly deterrent 10 includes the motor 34 it can be used with the motor 34 turned off for much of the time, as desired. If maximum effectiveness at deterring the entry or approach of the flies 17 is desired, the on-off switch 36 is turned to the on position. This causes a driven shaft 44 that extends from an underside of the motor 34 downward and which is attached to the upper outwardly facing plane 22 of the container 12 to slowly rotate. This, in turn, causes the container 12 to slowly rotate.

Slow rotation of the container 12 is believed to improve efficacy of the fly deterrent 10 in repelling (i.e., deterring the approach of) the fly 17. This is believed to be true because observation confirms that during rotation of the container 12 additional flashes of reflective light emanate outward and it is believed that these flashes of light deter the fly 17 from continuing its approach.

It is important to note that for stationary versions of the fly deterrent 10, the liquid 30 (i.e., water 30a) acts as a lens to reflect light outward. Therefore, to the approaching fly 17, frequent flashes of light reflecting off the pennies 28 occur. Rotation of the container 12 is believed to increase the frequency of these flashes. However, the fly deterrent 10 is still effective if the motor 34 is eliminated or if the on-off switch 36 is set to off.

The pennies 28 are important and significantly improve efficacy of the fly deterrent 10 by increasing the reflective light. It is also possible that the wavelength of the reflected light from the pennies 28 is especially noticeable or meaningful to the fly 17. For whatever reason or reasons, the plurality of pennies 28 disposed in the pockets 26 provides a highly effective version of the fly deterrent 10.

If desired, the pockets 26 can be eliminated and other means, such as the use of an adhesive, can be used to secure the pennies 28 where desired.

Figure 2:
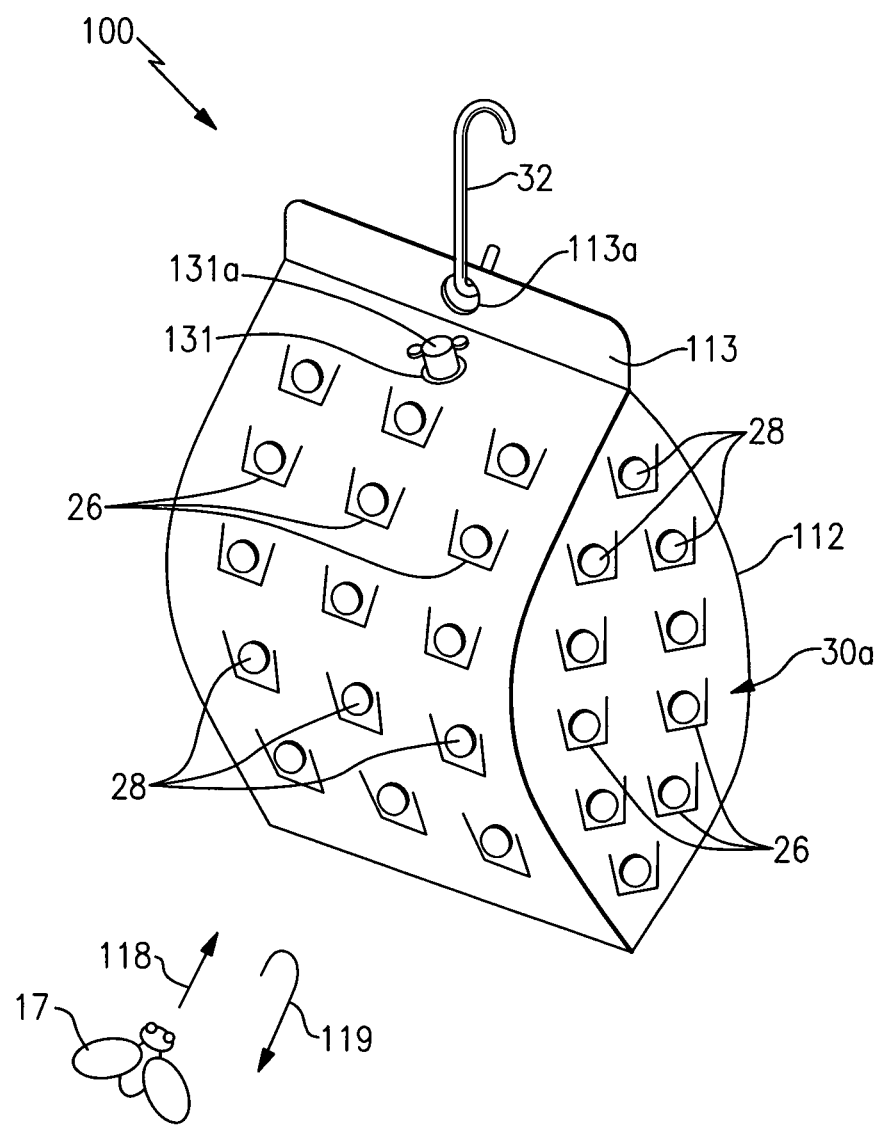
FIG. 2 is a view in perspective of an alternate embodiment of a fly deterrent.

Referring now to FIG. 2 is shown an alternate embodiment of a modified fly deterrent, identified in general by the reference numeral 100.

The modified fly deterrent 100 includes a modified container 112 that is formed of a transparent flexible plastic bag. A seam 113 at a top of the modified container 112 is sealed by any preferred means and the modified container 112 is preferably filled with clear water 30a as the liquid 30, which remains in the modified container 112 and cannot leak or evaporate.

If desired, a modified fill hole 131 is provided preferably at or near a top of the modified container 112. The optional modified fill hole 131 includes a detachable plug 131a that is urged out of an opening of the modified fill hole 131 when it is necessary to add water 30a into the modified container 112. The detachable plug 131a is secured to the opening of the modified fill hole 131 by friction, screw threads or any preferred means.

The seam 113 includes a seam hole 113a. A lower portion of the hook 32 is attached to the seam hole 113a.

The interior surfaces of the modified container 112 include a plurality of spaced-apart pockets 26. The penny 28 is disposed in each of the pockets 26. If desired, the pennies 28 could be adhered or secured to the inside surface of the modified container 112 by any preferred means. If preferred, copper planar disks could be used instead of the pennies 28.

The modified fly deterrent 100 operates in a similar manner as the fly deterrent 10 to deter flies 17 from approaching the modified fly deterrent 100. For example, the fly 17 approaching the modified fly deterrent 100 along line 118 sees light reflected off of one or more of the pennies 28. This causes the fly 17 to change course, as shown by arrow 119 and fly away from the modified fly deterrent 100.

Accordingly, the modified fly deterrent 100 provides a lower cost version of the invention. Being made of a flexible material and being fillable by the user, the modified fly deterrent 100 folds flat for shipping, is lightweight, and water 30a can be added by the user when its use is desired. During winter months, the water 30a can be drained out of the modified fill hole 131, after removing the detachable plug 131a, until the modified fly deterrent 100 is again needed for use.

If an object of a different shape than the penny 28 or a different color (i.e., other than copper color) is found to be effective, it can be inserted in one or more of the pockets 26 instead of the penny 28. Refer momentarily to FIG. 1 which shows a modified object 28a. The modified object 28a includes a planar shape other than round and a color other than copper. It is also possible to intermix a plurality of the objects (i.e., the pennies 28) alongside a plurality of the modified objects 28a in the pockets 26. For example, different colored versions of the modified objects 28a of any desired color or range of colors can be inserted in the pockets 26 instead of the pennies 28 or in addition to an assortment of the pennies 28. The use of the modified objects 28a having different colors, shapes, and varying degrees of reflectivity can be used instead of the pennies 28 or alongside the pennies 28, as desired. Experimentation can be used to provide an optimum assortment of objects and the modified objects 28a of any color or colors and having any desired shape or combination of shapes that are inserted in an optimum arrangement pattern in the pockets 26 and which, taken together, provide a version of the fly deterrent 10 or a version of the modified fly deterrent 100 that is optimally effective at repelling flies 17.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A fly deterrent, comprising:
   (a) a transparent container;
   (b) a hook attached to an upper portion of said container;
   (c) a plurality of planar objects attached in a spaced-apart orientation to all of said container;
   (d) a quantity of a liquid disposed in said container;
   (e) wherein at least one of said plurality of planar objects includes a round planar object; and
   (f) wherein said round planar object includes a penny.

2. The fly deterrent of claim 1 wherein said container is formed of a flexible material.

3. The fly deterrent of claim 2 wherein said container is formed of transparent plastic film.

4. The fly deterrent of claim 1 including a plurality of pockets attached to an interior surface of said container, and wherein one of said plurality of objects is disposed in each of said pockets.

5. The fly deterrent of claim 1 wherein said liquid includes water.

6. The fly deterrent of claim 1 wherein said liquid includes a color tint.

7. The fly deterrent of claim 1 wherein said container is sealed.

8. The fly deterrent of claim 1 wherein said container includes an opening for filling said container with said liquid.

9. The fly deterrent of claim 8 wherein said opening can be used to drain said liquid from said container.

10. The fly deterrent of claim 1 wherein said at least one of said plurality of planar objects is made of copper.

11. The fly deterrent of claim 1 wherein a surface of said at least one of said plurality of planar objects includes a copper color.

* * * * *